US009525356B2

(12) United States Patent
Hirano et al.

(10) Patent No.: US 9,525,356 B2
(45) Date of Patent: Dec. 20, 2016

(54) ELECTRIC POWER CONVERSION SYSTEM

(71) Applicants: Takahiro Hirano, Toyota (JP);
Yasuharu Terada, Toyota (JP)

(72) Inventors: Takahiro Hirano, Toyota (JP);
Yasuharu Terada, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 484 days.

(21) Appl. No.: 14/074,775

(22) Filed: Nov. 8, 2013

(65) Prior Publication Data

US 2014/0132066 A1 May 15, 2014

(30) Foreign Application Priority Data

Nov. 9, 2012 (JP) ................. 2012-247829

(51) Int. Cl.
*H02M 3/335* (2006.01)
(52) U.S. Cl.
CPC ....... *H02M 3/33584* (2013.01); *Y10T 307/297* (2015.04)
(58) Field of Classification Search
CPC ............... H02M 3/33561; H02M 3/33584; Y10T 307/297
USPC ........................................................ 307/17
See application file for complete search history.

(56) References Cited

U.S. PATENT DOCUMENTS

| 5,162,663 | A | * | 11/1992 | Combs | ................ | H02J 9/061 |
|---|---|---|---|---|---|---|
| | | | | | | 307/29 |
| 5,986,617 | A | * | 11/1999 | McLellan | ................ | H03H 7/38 |
| | | | | | | 323/355 |
| 6,297,616 | B1 | * | 10/2001 | Kubo | .................... | H02J 7/0027 |
| | | | | | | 320/116 |
| 2008/0101096 | A1 | * | 5/2008 | Takayanagi | ........... | H02J 7/0013 |
| | | | | | | 363/17 |
| 2011/0198933 | A1 | * | 8/2011 | Ishigaki | ................. | B60R 25/00 |
| | | | | | | 307/66 |
| 2011/0228569 | A1 | * | 9/2011 | Zheng | .................... | H02M 1/44 |
| | | | | | | 363/21.12 |

FOREIGN PATENT DOCUMENTS

| CN | 101820710 A | 9/2010 |
|---|---|---|
| JP | 2011-115112 A | 6/2011 |
| JP | 2011-193713 A | 9/2011 |
| JP | 2011-244523 A | 12/2011 |
| JP | 2012-115112 A | 6/2012 |
| WO | 2011/141785 A1 | 11/2011 |

* cited by examiner

*Primary Examiner* — Rexford Barnie
*Assistant Examiner* — Elim Ortiz
(74) *Attorney, Agent, or Firm* — Sughrue Mion, PLLC

(57) ABSTRACT

An electric power conversion system includes a primary conversion circuit, and a secondary conversion circuit magnetically coupled to the primary conversion circuit by a transformer. At least one of the primary conversion circuit and the secondary conversion circuit includes a bypass circuit that short-circuits respective ends of a coil constituting the transformer. The primary conversion circuit, the secondary conversion circuit, the bypass circuit, and the transformer are configured such that electric power conversion is performed between any two input/output ports from among four input/output ports formed of two input/output ports of the primary conversion circuit and two input/output ports of the secondary conversion circuit.

10 Claims, 4 Drawing Sheets

ELECTRIC POWER CONVERSION SYSTEM

INCORPORATION BY REFERENCE

The disclosure of Japanese Patent Application No. 2012-247829, filed on Nov. 9, 2012 including the specification, drawings and abstract is incorporated herein by reference in its entirety.

BACKGROUND OF THE INVENTION

1. Field of the Invention

The invention relates to an electric power conversion system that includes a primary conversion circuit and a secondary conversion circuit magnetically coupled to the primary conversion circuit via a transformer.

2. Description of Related Art

For example, Japanese Patent Application Publication No. 2011-193713 (JP 2011-193713 A) is known as a related art document regarding an electric power conversion system that includes a primary conversion circuit and a secondary conversion circuit magnetically coupled to the primary conversion circuit via a transformer. In JP 2011-193713 A, a step-up/step-down operation is performed between two input/output ports of the secondary conversion circuit at the same time as a step-up/step-down operation is performed between two input/output ports of the primary conversion circuit.

With the circuit configuration design of JP 2011-193713 A, however, the primary conversion circuit and the secondary conversion circuit must have identical step-up/step-down ratios.

SUMMARY OF THE INVENTION

The invention provides an electric power conversion system in which primary and secondary conversion circuits are caused to perform step-up/step-down operations at respective desired step-up/step-down ratios.

An electric power conversion system according to a first aspect of the invention includes a primary conversion circuit, and a secondary conversion circuit that is magnetically coupled to the primary conversion circuit via a transformer. At least one of the primary conversion circuit and the secondary conversion circuit includes a bypass circuit that short-circuits respective ends of a coil constituting the transformer. The primary conversion circuit, the secondary conversion circuit, the bypass circuit, and the transformer are configured such that electric power conversion is performed between any two input/output ports from among four input/output ports formed of two input/output ports of the primary conversion circuit and two input/output ports of the secondary conversion circuit.

According to the aspect described above, it is possible to cause the primary and secondary conversion circuits to perform step-up/step-down operations at respective desired step-up/step-down ratios.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Configuration of Electric Power Conversion System 100

Figure 1:
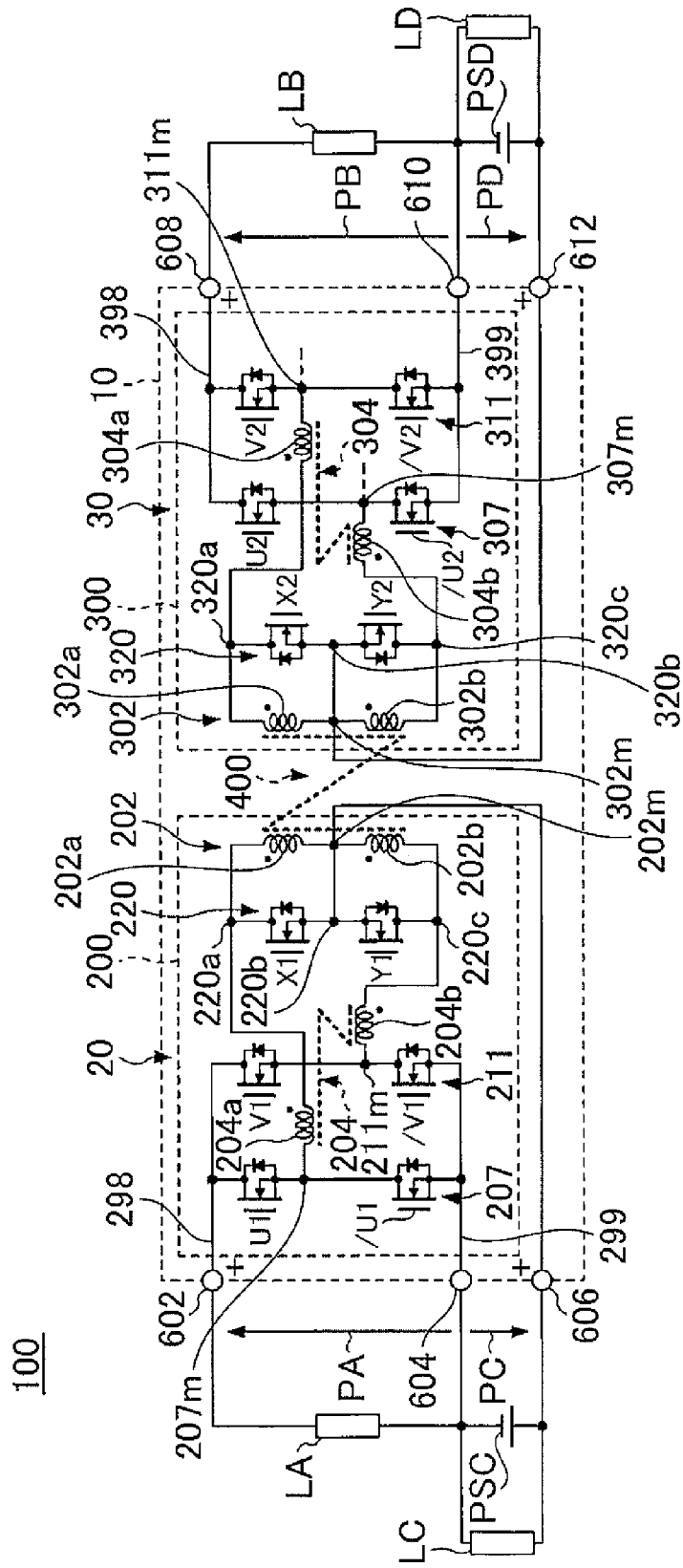
FIG. 1 is a view showing a configuration of an electric power conversion system according to an embodiment of the invention.

FIG. 1 is a view that shows an electric power conversion system 100 that includes an electric power conversion circuit 10. The electric power conversion system 100 is an electric power conversion system configured to include the electric power conversion circuit 10 and a control circuit 50 (see FIG. 2, and the details will be described later). The electric power conversion circuit 10 has the function of selecting any two input/output ports from among four input/output ports and converting electric power between the selected two input/output ports. The electric power conversion circuit 10 is configured to include a primary conversion circuit 20 and a secondary conversion circuit 30. The primary conversion circuit 20 and the secondary conversion circuit 30 are magnetically coupled to each other via a transformer 400 (center tap transformer).

The primary conversion circuit 20 is configured to include a primary full-bridge circuit 200, a first input/output port PA and a second input/output port PC. The primary full-bridge circuit 200 is configured to include a primary coil 202 of the transformer 400, a primary magnetic coupling reactor 204, a primary first upper arm U1, a primary first lower arm /U1, a primary second upper arm V1 and a primary second lower arm /V1. Here, the primary first upper arm U1, the primary first lower arm /U1, the primary second upper arm V1 and the primary second lower arm /V1 each are, for example, a switching element configured to include an N-channel MOSFET and a body diode that is a parasitic element of the MOSFET. A diode may be additionally connected in parallel with the MOSFET.

The primary full-bridge circuit 200 includes a primary positive electrode bus 298 and a primary negative electrode bus 299. The primary positive electrode bus 298 is connected to a high-potential terminal 602 of the first input/output port PA. The primary negative electrode bus 299 is connected to a low-potential terminal 604 of the first input/output port PA and second input/output port PC.

A primary first arm circuit 207 is connected between the primary positive electrode bus 298 and the primary negative electrode bus 299. The primary first arm circuit 207 is formed by serially connecting the primary first upper arm U1 and the primary first lower arm /U1. Furthermore, a primary second arm circuit 211 is connected between the primary positive electrode bus 298 and the primary negative electrode bus 299 in parallel with the primary first arm circuit 207. The primary second arm circuit 211 is formed by serially connecting the primary second upper arm V1 and the primary second lower arm /V1.

The primary coil 202 and the primary magnetic coupling reactor 204 are provided at a bridge portion that connects a midpoint 207m of the primary first arm circuit 207 to a midpoint 211m of the primary second arm circuit 211. A connection relationship at the bridge portion will be described in more detail. One end of a primary first reactor 204a of the primary magnetic coupling reactor 204 is connected to the midpoint 207m of the primary first arm circuit 207. One end of the primary coil 202 is connected to the other end of the primary first reactor 204a. Furthermore, one end of a primary second reactor 204b of the primary magnetic coupling reactor 204 is connected to the other end of the primary coil 202. Moreover, the other end of the primary second reactor 204b is connected to the midpoint 211m of the primary second arm circuit 211. The primary magnetic coupling reactor 204 is configured to include the primary first reactor 204a and the primary second reactor 204b magnetically coupled to the primary first reactor 204a.

The midpoint 207m is a primary first intermediate node between the primary first upper arm U1 and the primary first lower arm /U1. The midpoint 211m is a primary second intermediate node between the primary second upper arm V1 and the primary second lower arm /V1.

The first input/output port PA is a port provided between the primary positive electrode bus 298 and the primary negative electrode bus 299. The first input/output port PA is configured to include the terminal 602 and the terminal 604. The second input/output port PC is a port provided between the primary negative electrode bus 299 and a center tap 202m of the primary coil 202. The second input/output port PC is configured to include the terminal 604 and a terminal 606.

The center tap 202m is connected to the high-potential terminal 606 of the second input/output port PC. The center tap 202m is an intermediate connection point between a primary first winding 202a and a primary second winding 202b that constitute the primary coil 202.

The electric power conversion system 100 is, for example, configured to include the primary high voltage system load LA, a primary low voltage system load LC and a primary low voltage system power supply PSC. The primary high voltage system load LA is connected to the first input/output port PA. The primary low voltage system load LC and the primary low voltage system power supply PSC are connected to the second input/output port PC. The primary low voltage system power supply PSC supplies electric power to the primary low voltage system load LC that operates at the same voltage system (for example, 12 V system) as the primary low voltage system power supply PSC. In addition, the primary low voltage system power supply PSC supplies electric power, stepped up by the primary full-bridge circuit 200, to the primary high voltage system load LA that operates at the voltage system (for example, 48 V system higher than 12 V system) different from that of the primary low voltage system power supply PSC. A specific example of the primary low voltage system power supply PSC is a secondary battery, such as a lead-acid battery.

The secondary conversion circuit 30 is configured to include a secondary full-bridge circuit 300, a third input/output port PB and a fourth input/output port PD. The secondary full-bridge circuit 300 is configured to include a secondary coil 302 of the transformer 400, a secondary magnetic coupling reactor 304, a secondary first upper arm U2, a secondary first lower arm /U2, a secondary second upper arm V2 and a secondary second lower arm /V2. Here, the secondary first upper arm U2, the secondary first lower arm /U2, the secondary second upper arm V2 and the secondary second lower arm /V2 each are, for example, a switching element configured to include an N-channel MOSFET and a body diode that is a parasitic element of the MOSFET. A diode may be additionally connected in parallel with the MOSFET.

The secondary full-bridge circuit 300 includes a secondary positive electrode bus 398 and a secondary negative electrode bus 399. The secondary positive electrode bus 398 is connected to a high-potential terminal 608 of the third input/output port PB. The secondary negative electrode bus 399 is connected to a low-potential terminal 610 of the third input/output port PB and fourth input/output port PD.

A secondary first arm circuit 307 is connected between the secondary positive electrode bus 398 and the secondary negative electrode bus 399. The secondary first arm circuit 307 is formed by serially connecting the secondary first upper arm U2 and the secondary first lower arm /U2. Furthermore, a secondary second arm circuit 311 is connected between the secondary positive electrode bus 398 and the secondary negative electrode bus 399 in parallel with the secondary first arm circuit 307. The secondary second arm circuit 311 is formed by serially connecting the secondary second upper arm V2 and the secondary second lower arm /V2.

The secondary coil 302 and the secondary magnetic coupling reactor 304 are provided at a bridge portion that connects a midpoint 307m of the secondary first arm circuit 307 to a midpoint 311m of the secondary second arm circuit 311. A connection relationship at the bridge portion will be described in more detail. One end of a secondary first reactor 304a of the secondary magnetic coupling reactor 304 is connected to the midpoint 311m of the secondary second arm circuit 311. One end of the secondary coil 302 is connected to the other end of the secondary first reactor 304a. Furthermore, one end of a secondary second reactor 304b of the secondary magnetic coupling reactor 304 is connected to the other end of the secondary coil 302. Moreover, the other end of the secondary second reactor 304b is connected to the midpoint 307m of the secondary first aim circuit 307. The secondary magnetic coupling reactor 304 is configured to include the secondary first reactor 304a and the secondary second reactor 304b magnetically coupled to the secondary first reactor 304a.

The midpoint 307m is a secondary first intermediate node between the secondary first upper arm U2 and the secondary first lower arm /U2. The midpoint 311m is a secondary second intermediate node between the secondary second upper arm V2 and the secondary second lower arm /V2.

The third input/output port PB is a port provided between the secondary positive electrode bus 398 and the secondary negative electrode bus 399. The third input/output port PB is configured to include the terminal 608 and the terminal 610. The fourth input/output port PD is a port provided between the secondary negative electrode bus 399 and a center tap 302m of the secondary coil 302. The fourth input/output port PD is configured to include the terminal 610 and a terminal 612.

The center tap 302m is connected to the high-potential terminal 612 of the fourth input/output port PD. The center tap 302m is an intermediate connection point between a secondary first winding 302a and a secondary second winding 302b that constitute the secondary coil 302.

The electric power conversion system 100 is, for example, configured to include the secondary high voltage system load LB, a secondary low voltage system load LD and a secondary low voltage system power supply PSD. The secondary high voltage system load LB is connected to the third input/output port PB. The secondary low voltage system load LD and the secondary low voltage system power supply PSD are connected to the fourth input/output port PD. The secondary low voltage system power supply PSD supplies electric power to the secondary low voltage system load LD that operates at the same voltage system (for example, 72 V system higher than 12 V system or 48 V system) as the secondary low voltage system power supply PSD. In addition, the secondary low voltage system power supply PSD supplies electric power, stepped up by the secondary full-bridge circuit 300, to the secondary high voltage system load LB that operates at the voltage system (for example, 288 V system higher than 72 V system) different from that of the secondary low voltage system power supply PSD. A specific example of the secondary low voltage system power supply PSD is a secondary battery, such as a lithium ion battery.

The electric power conversion circuit 10 of the electric power conversion circuit system 100 includes a bypass circuit that short-circuits respective ends of the coils constituting the transformer 400. The bypass circuit causes the transformer 400 to stop functioning, whereby electric power transmission between the primary conversion circuit 20 and the secondary conversion circuit 30 can be stopped. As a result, as will be described in detail below, the primary conversion circuit 20 and the secondary conversion circuit 30 can be caused to perform step-up/step-down operations at respective desired step-up/step-down ratios. In FIG. 1, a primary bypass circuit 220 and a secondary bypass circuit 320 are shown as examples of the bypass circuit.

The primary bypass circuit 220 includes short-circuiting means for connecting the primary magnetic coupling reactor 204 directly to the center tap 202m without passing through the primary coil 202 of the transformer 400. The primary bypass circuit 220 includes, as the short-circuiting means, a primary first short-circuit control element X1 capable of short-circuiting respective ends of the primary first winding 202a, and a primary second short-circuit control element Y1 capable of short-circuiting respective ends of the primary second winding 202b. An intermediate connection point 220b between the primary first short-circuit control element X1 and the primary second short-circuit control element Y1 is connected to the center tap 202m.

The primary first short-circuit control element X1 is a switching element configured to include, for example, an N channel MOSFET and a body diode serving as a parasitic element of the MOSFET. The primary second short-circuit control element Y1 is a switching element configured to include, for example, a P channel MOSFET and a body diode serving as a parasitic element of the MOSFET. Additional diodes may be connected to the respective MOSFETs of the primary first short-circuit control element X1 and the primary second short-circuit control element Y1 in parallel.

When the primary first short-circuit control element X1 is switched from OFF to ON, the respective ends of the primary first winding 202a are short-circuited. As a result, a bypass circuit in which an upper intermediate connection point 220a, to which one end of the primary first reactor 204a and one end of the primary first winding 202a are connected, is directly connected to the center tap 202m without passing through the primary first winding 202a is formed. Similarly, when the primary second short-circuit control element Y1 is switched from OFF to ON, the respective ends of the primary second winding 202b are short-circuited, and as a result, a bypass circuit in which a lower intermediate connection point 220c, to which one end of the primary second reactor 204b and one end of the primary second winding 202b are connected, is directly connected to the center tap 202m without passing through the primary second winding 202b is formed.

Further, when both the primary first short-circuit control element X1 and the primary second short-circuit control element Y1 are switched from OFF to ON, the respective ends of the primary coil 202 (the upper intermediate connection point 220a and the lower intermediate connection point 220c) are short-circuited.

The secondary bypass circuit 320 includes short-circuiting means for connecting the secondary magnetic coupling reactor 304 directly to the center tap 302m without passing through the secondary coil 302 of the transformer 400. The secondary bypass circuit 320 includes, as the short-circuiting means, a secondary first short-circuit control element X2 capable of short-circuiting respective ends of the secondary first winding 302a, and a secondary second short-circuit control element Y2 capable of short-circuiting respective ends of the secondary second winding 302b. An intermediate connection point 320b between the secondary first short-circuit control element X2 and the secondary second short-circuit control element Y2 is connected to the center tap 302m.

The secondary first short-circuit control element X2 is a switching element configured to include, for example, an N channel MOSFET and a body diode serving as a parasitic element of the MOSFET. The secondary second short-circuit control element Y2 is a switching element configured to include, for example, a P channel MOSFET and a body diode serving as a parasitic element of the MOSFET. Additional diodes may be connected to the respective MOSFETs of the secondary first short-circuit control element X2 and the secondary second short-circuit control element Y2 in parallel.

When the secondary first short-circuit control element X2 is switched from OFF to ON, the respective ends of the secondary first winding 302a are short-circuited. As a result, a bypass circuit in which an upper intermediate connection point 320a, to which one end of the secondary first reactor 304a and one end of the secondary first winding 302a are connected, is directly connected to the center tap 302m without passing through the secondary first winding 302a is formed. Similarly, when the secondary second short-circuit control element Y2 is switched from OFF to ON, the respective ends of the secondary second winding 302b are short-circuited, and as a result, a bypass circuit in which a lower intermediate connection point 320c, to which one end of the secondary second reactor 304b and one end of the secondary second winding 302b are connected, is directly connected to the center tap 302m without passing through the secondary second winding 302b is formed.

Further, when both the secondary first short-circuit control element X2 and the secondary second short-circuit control element Y2 are switched from OFF to ON, the respective ends of the secondary coil 302 (the upper intermediate connection point 320a and the lower intermediate connection point 320c) are short-circuited.

Figure 2:
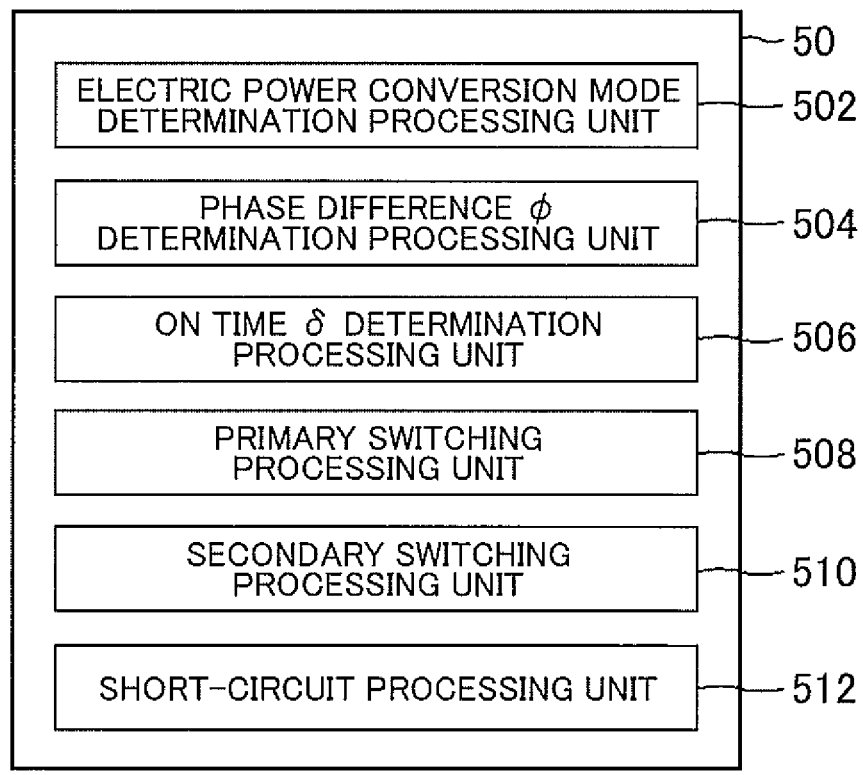
FIG. 2 is a block diagram showing a control circuit according to an embodiment of the invention.

FIG. 2 is a block diagram of the control circuit 50. The control circuit 50 has the function of executing switching control over the switching elements, such as the primary first upper arm U1, of the primary conversion circuit 20 and the switching elements, such as the secondary first upper arm U2, of the secondary conversion circuit 30. The control circuit 50 is configured to include an electric power conversion mode determination processing unit 502, a phase difference φ determination processing unit 504, an on time δ determination processing unit 506, a primary switching processing unit 508, a secondary switching processing unit 510 and a short-circuit processing unit 512. The control circuit 50 is, for example, an electronic circuit including a microcomputer that incorporates a CPUs.

The electric power conversion mode determination processing unit 502 selects and determines an operation mode from among electric power conversion modes A to L of the electric power conversion circuit 10, described below, on the basis of an external signal (not shown). The electric power conversion modes include the mode A, the mode B and the mode C. In the mode A, electric power input from the first input/output port PA is converted and output to the second input/output port PC. In the mode B, electric power input from the first input/output port PA is converted and output to the third input/output port PB. In the mode C, electric power input from the first input/output port PA is converted and output to the fourth input/output port PD.

In addition, the electric power conversion modes further include the mode D, the mode E and the mode F. In the mode D, electric power input from the second input/output port PC is converted and output to the first input/output port PA. In the mode E, electric power input from the second input/output port PC is converted and output to the third input/output port PB. In the mode F, electric power input from the second input/output port PC is converted and output to the fourth input/output port PD.

The electric power conversion modes further include the mode G, the mode H and the mode I. In the mode G, electric power input from the third input/output port PB is converted and output to the first input/output port PA. In the mode H, electric power input from the third input/output port PB is converted and output to the second input/output port PC. In the mode I, electric power input from the third input/output port PB is converted and output to the fourth input/output port PD.

Moreover, the electric power conversion modes further include the mode J, the mode K and the mode L. In the mode J, electric power input from the fourth input/output port PD is converted and output to the first input/output port PA. In the mode K, electric power input from the fourth input/output port PD is converted and output to the second input/output port PC. In the mode L, electric power input from the fourth input/output port PD is converted and output to the third input/output port PB.

The phase difference $\phi$ determination processing unit 504 has the function of setting a phase difference $\phi$ in the switching period of the switching elements between the primary conversion circuit 20 and the secondary conversion circuit 30 in order to cause the electric power conversion circuit 10 to function as a DC-DC converter circuit.

The on time $\delta$ determination processing unit 506 has the function of setting an on time $\delta$ of each of the switching elements of the primary conversion circuit 20 and secondary conversion circuit 30 in order to cause each of the primary conversion circuit 20 and the secondary conversion circuit 30 to function as a step-up/step-down circuit.

The primary switching processing unit 508 has the function of executing switching control over the switching elements, that is, the primary first upper arm U1, the primary first lower arm /U1, the primary second upper arm V1 and the primary second lower arm /V1, on the basis of outputs of the electric power conversion mode determination processing unit 502, the phase difference $\phi$ determination processing unit 504 and the on time $\delta$ determination processing unit 506.

The secondary switching processing unit 510 has the function of executing switching control over the switching elements, that is, the secondary first upper arm U2, the secondary first lower arm /U2, the secondary second upper arm V2 and the secondary second lower arm /V2, on the basis of the outputs of the electric power conversion mode determination processing unit 502, the phase difference $\phi$ determination processing unit 504 and the on time $\delta$ determination processing unit 506.

The short-circuit processing unit 512 has a function of executing short-circuit control on the respective ends of the coils constituting the transformer 400 on the basis of an external signal, not shown in the drawing.

Operation of Electric Power Conversion System 100

The operation of the electric power conversion system 100 will be described with reference to FIG. 1. For example, when an external signal that requires the electric power conversion circuit 10 to operate in the mode F is input, the electric power conversion mode determination processing unit 502 of the control circuit 50 determines the electric power conversion mode of the electric power conversion circuit 10 as the mode F. At this time, the voltage input to the second input/output port PC is stepped up by the step-up function of the primary conversion circuit 20, the stepped-up voltage is transferred to the third input/output port PB side by the function of the electric power conversion circuit 10 as the DC-DC converter circuit and is further stepped down by the step-down function of the secondary conversion circuit 30, and the resultant voltage is output from the fourth input/output port PD.

Here, the details of the step-up/step-down function of the primary conversion circuit 20 will be described in detail. Focusing on the second input/output port PC and the first input/output port PA, the terminal 606 of the second input/output port PC is connected to the midpoint 207m of the primary first arm circuit 207 via the primary first winding 202a and the primary first reactor 204a serially connected to the primary first winding 202a. Both ends of the primary first arm circuit 207 are connected to the first input/output port PA, with the result that a step-up/step-down circuit is connected between the terminal 606 of the second input/output port PC and the first input/output port PA.

Furthermore, the terminal 606 of the second input/output port PC is connected to the midpoint 211m of the primary second arm circuit 211 via the primary second winding 202b and the primary second reactor 204b serially connected to the primary second winding 202b. Both ends of the primary second arm circuit 211 are connected to the first input/output port PA, with the result that a step-up/step-down circuit is connected between the terminal 606 of the second input/output port PC and the first input/output port PA in parallel with the above-described step-up/step-down circuit. The secondary conversion circuit 30 is a circuit having a substantially similar configuration to that of the primary conversion circuit 20, with the result that two step-up/step-down circuits are connected in parallel with each other between the terminal 612 of the fourth input/output port PD and the third input/output port PB. Thus, the secondary conversion circuit 30 has a similar step-up/step-down function to that of the primary conversion circuit 20.

Next, the function of the electric power conversion circuit 10 as the DC-DC converter circuit will be described in detail. Focusing on the first input/output port PA and the third input/output port PB, the primary full-bridge circuit 200 is connected to the first input/output port PA, and the secondary full-bridge circuit 300 is connected to the third input/output port PB. The primary coil 202 provided at the bridge portion of the primary full-bridge circuit 200 and the secondary coil 302 provided at the bridge portion of the secondary full-bridge circuit 300 are magnetically coupled to each other, thus functioning as the transformer 400 (the center tap transformer having a winding number ratio of 1:N). Thus, by adjusting the phase difference of the switching period of the switching elements between the primary full-bridge circuit 200 and the secondary full-bridge circuit 300, it is possible to convert electric power input to the first input/output port PA and transfer the electric power to the third input/output port PB or convert electric power input to the third input/output port PB and transfer the electric power to the first input/output port PA.

Figure 3:
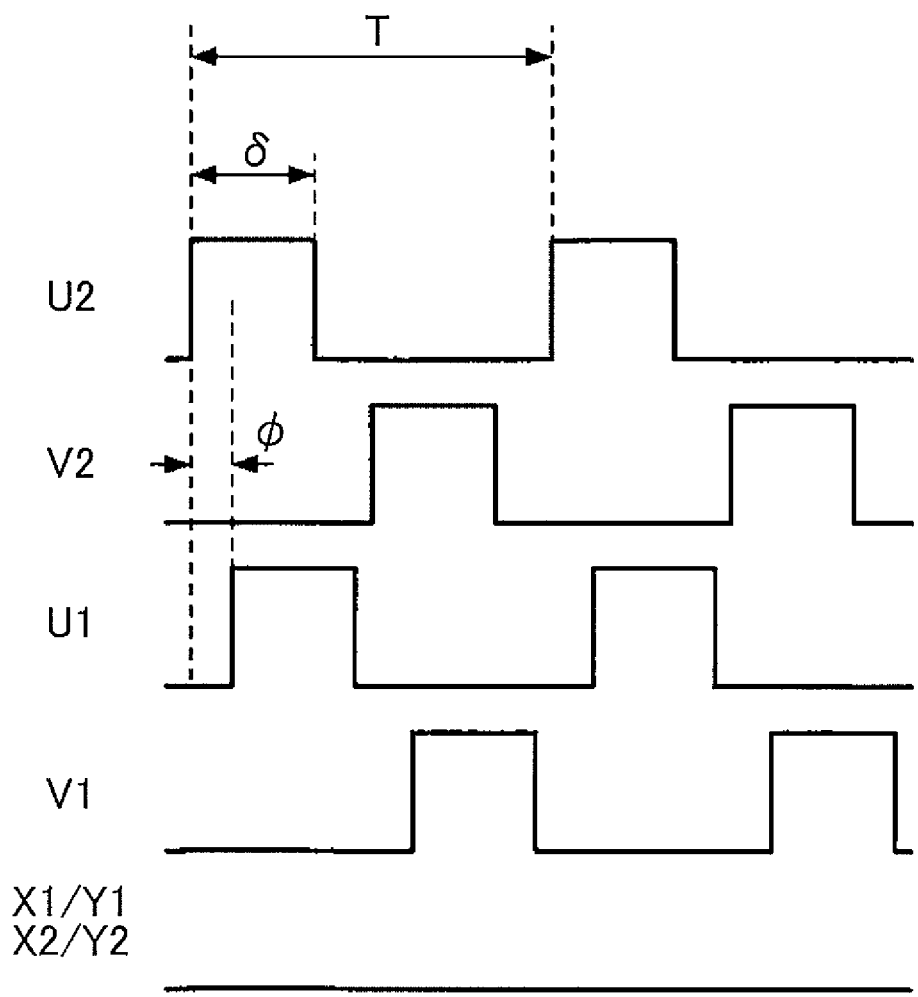
FIG. 3 is a timing chart showing a case in which step-up/step-down ratios on a primary and a secondary of the electric power conversion system are identical.

FIG. 3 is a view that shows a timing chart regarding voltages supplied to the electric power conversion circuit 10 through control over the control circuit 50. In FIG. 3, U1 is an on/off waveform of the primary first upper arm U1, V1 is an on/off waveform of the primary second upper arm V1, U2 is an on/off waveform of the secondary first upper arm U2, and V2 is an on/off waveform of the secondary second upper arm V2. On/off waveforms of the primary first lower arm /U1, primary second lower arm /V1, secondary first lower arm /U2 and secondary second lower arm /V2 are respectively waveforms inverted from the on/off waveforms of the primary first upper arm U1, primary second upper arm V1, secondary first upper arm U2 and secondary second upper arm V2 (not shown). It is desirable that a dead time be provided between both on/off waveforms of each pair of upper and lower arms such that no flow-through current flows as a result of the on states of both upper and lower arms. In FIG. 3, the high level indicates the on state, and the low level indicates the off state.

Here, by changing the on time δ of each of U1, V1, U2 and V2, it is possible to change a step-up/step-down ratio of the primary conversion circuit 20 and a step-up/step-down ratio of the secondary conversion circuit 30. For example, by equalizing the on time δ of each of U1, V1, U2 and V2 to one another, it is possible to equalize the step-up/step-down ratio of the primary conversion circuit 20 to the step-up/step-down ratio of the secondary conversion circuit 30. The phase difference between U1 and V1 is set to 180 degrees (π), and the phase difference between U2 and V2 is also set to 180 degrees (π). Furthermore, by changing the phase difference φ between U1 and U2, it is possible to adjust the amount of electric power transferred between the primary conversion circuit 20 and the secondary conversion circuit 30. When the phase difference φ is larger than 0, it is possible to transfer electric power from the primary conversion circuit 20 to the secondary conversion circuit 30; whereas, when the phase difference φ is smaller than 0, it is possible to transfer electric power from the secondary conversion circuit 30 to the primary conversion circuit 20.

Thus, for example, when an external signal that requires the electric power conversion circuit 10 to operate in the mode F is input, the electric power conversion mode determination processing unit 502 determines to select the mode F. The on time δ determination processing unit 506 sets the on time δ that prescribes the step-up ratio in the case where the primary conversion circuit 20 is caused to function as a step-up circuit that steps up voltage input to the second input/output port PC and outputs the stepped-up voltage to the first input/output port PA. The secondary conversion circuit 30 functions as a step-down circuit that steps down voltage input to the third input/output port PB at the step-down ratio prescribed by the on time δ set by the on time δ determination processing unit 506 and outputs the stepped-down voltage to the fourth input/output port PD. Furthermore, the phase difference φ determination processing unit 504 sets the phase difference φ for transferring electric power, input to the first input/output port PA, to the third input/output port PB at a desired amount of electric power transferred.

The primary switching processing unit 508 executes switching control over the switching elements, that is, the primary first upper arm U1, the primary first lower arm /U1, the primary second upper arm V1 and the primary second lower arm /V1, such that the primary conversion circuit 20 is caused to function as the step-up circuit and the primary conversion circuit 20 is caused to function as part of the DC-DC converter circuit.

The secondary switching processing unit 510 executes switching control over the switching elements, that is, the secondary first upper arm U2, the secondary first lower arm /U2, the secondary second upper arm V2 and the secondary second lower arm /V2, such that the secondary conversion circuit 30 is caused to function as the step-down circuit and the secondary conversion circuit 30 is caused to function as part of the DC-DC converter circuit.

As described above, it is possible to cause each of the primary conversion circuit 20 and the secondary conversion circuit 30 to function as the step-up circuit or the step-down circuit, and it is possible to cause the electric power conversion circuit 10 to also function as the bidirectional DC-DC converter circuit. Thus, it is possible to convert electric power in all of the electric power conversion modes A to L, in other words, it is possible to convert electric power between the two input/output ports selected from among the four input/output ports.

Control of Step-Up/Step-Down Ratio of Electric Power Conversion Circuit System 100

In the case where an external signal requesting the implementation of electric power transmission between the primary conversion circuit 20 and the secondary conversion circuit 30 is input, the short-circuit processing unit 512 operates the primary bypass circuit 220 and the secondary bypass circuit 320 to prevent a short-circuit between the respective ends of the coils constituting the transformer 400. For example, the short-circuit processing unit 512 sets both the primary first short-circuit control element X1 and the primary second short-circuit control element Y1 in the OFF condition to prevent a short-circuit between the respective ends of the primary coil 202. Similarly, the short-circuit processing unit 512 sets both the secondary first short-circuit control element X2 and the secondary second short-circuit control element Y2 in the OFF condition to prevent a short-circuit between the respective ends of the secondary coil 302.

To activate electric power transmission between the primary conversion circuit 20 and the secondary conversion circuit 30 correctly, the ON time δ determination processing unit 506 makes the respective ON times δ of U1, V1, U2, and V2 equal to each other so that the respective step-up/step-down ratios of the primary conversion circuit 20 and the secondary conversion circuit 30 are equal (see FIG. 3).

The step-up/step-down ratio of the primary conversion circuit 20 is determined by a duty ratio, which is a proportion of a switching period T of the switching elements constituting the full bridge circuit 200 occupied by the ON time δ. Similarly, the step-up/step-down ratio of the secondary conversion circuit 30 is determined by a duty ratio, which is a proportion of a switching period T of the switching elements constituting the full bridge circuit 300 occupied by the ON time δ.

Hence, in the case where electric power transmission is performed between the primary conversion circuit 20 and the secondary conversion circuit 30, the step-up/step-down ratio of the primary conversion circuit 20 equals the voltage of the second input/output port PC divided by the voltage of the first input/output port PA equals δ/T, and the step-up/ step-down ratio of the secondary conversion circuit 30 equals the voltage of the fourth input/output port PD divided by the voltage of the third input/output port PB equals δ/T, for example. In other words, the respective step-up/step-down ratios of the primary conversion circuit 20 and the secondary conversion circuit 30 take identical values (=δ/T).

Note that the ON times δ in FIG. 3 indicate the ON times of the primary first upper arm U1 and the primary second upper arm V1 and the ON times of the secondary first upper arm U2 and the secondary second upper arm V2.

On the other hand, in the case where an external signal requesting that the respective step-up/step-down ratios of the primary conversion circuit 20 and the secondary conversion circuit 30 be made different is input, the short-circuit processing unit 512 performs a short-circuit operation on the primary bypass circuit 220 and the secondary bypass circuit 320 so that the respective ends of the coils constituting the transformer 400 are short-circuited. For example, the short-circuit processing unit 512 sets both the primary first short-circuit control element X1 and the primary second short-circuit control element Y1 in the ON condition so that the respective ends of the primary coil 202 are short-circuited. Similarly, the short-circuit processing unit 512 sets both the secondary first short-circuit control element X2 and the secondary second short-circuit control element Y2 in the ON condition so that the respective ends of the secondary coil 302 are short-circuited.

In the case where the respective ends of the primary coil 202 and the secondary coil 302 are short-circuited, the electric power transmission function of the transformer 400 is stopped, and therefore electric power transmission between the primary conversion circuit 20 and the secondary conversion circuit 30 can be stopped.

Figure 4:
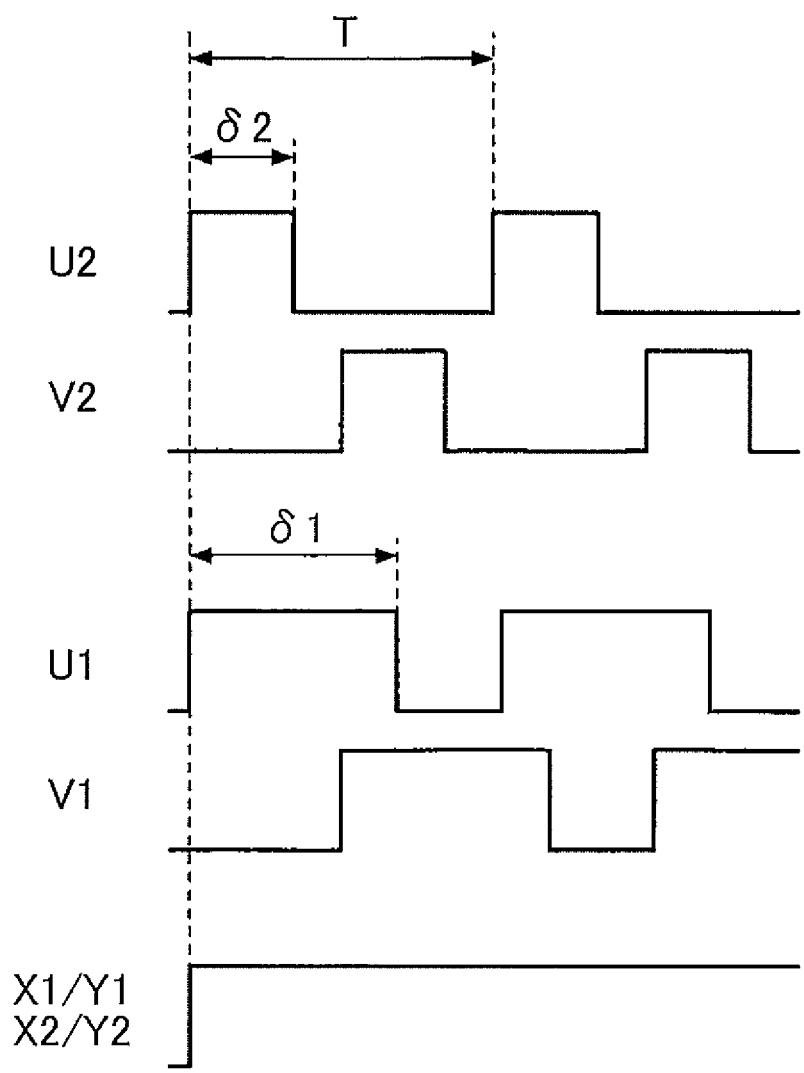
FIG. 4 is a timing chart showing a case in which the step-up/step-down ratios on the primary and the secondary of the electric power conversion system are different.

Accordingly, as shown in FIG. 4, the ON time δ determination processing unit 506 can respectively modify an ON time 81 and an ON time 82 to any desired values, and as a result, it is possible to cause the primary conversion circuit 20 and the secondary conversion circuit 30 to perform step-up/step-down operations at any desired step-up/step-down ratios. At this time, electric power transmission between the primary conversion circuit 20 and the secondary conversion circuit 30 is not performed, and therefore the phase difference φ may be set at any value (FIG. 4 shows a case in which φ=0).

Hence, in the case where the respective step-up/step-down ratios of the primary conversion circuit 20 and the secondary conversion circuit 30 are controlled to different values to each other, the step-up/step-down ratio of the primary conversion circuit 20 equals the voltage of the second input/output port PC divided by the voltage of the first input/output port PA equals δ1/T, and the step-up/step-down ratio of the secondary conversion circuit 30 equals the voltage of the fourth input/output port PD divided by the voltage of the third input/output port PB equals δ2/T, for example.

Note that in FIG. 4, the ON time 51 indicates the ON times of the primary first upper arm U1 and the primary second upper arm V1, and the ON time 52 indicates the ON times of the secondary first upper arm U2 and the secondary second upper arm V2.

According to this embodiment, as described above, it is possible to cause each of the primary conversion circuit 20 and the secondary conversion circuit 30 to perform step-up/step-down operations at any desired step-up/step-down ratios. Further, by short-circuiting the respective ends of the primary coil 202 and the secondary coil 302, it is possible to perform step-up/step-down operations without loss in the primary coil 202 and the secondary coil 302, and as a result, a step-up/step-down efficiency is improved.

An embodiment of an electric power conversion system was described above, but the invention is not limited to the above embodiment, and various modifications and improvements, such as combination or replacement with all or a part of other embodiments, may be implemented within the scope of the invention.

For example, in the above embodiment, a MOSFET, which is a semiconductor element that is ON/OFF-operated, was cited as an example of a switching element. However, the switching element may be a voltage control power element using an insulating gate such as an insulated gate bipolar transistor (IGBT) or a MOSFET, or a bipolar transistor, for example.

Further, in the above embodiment, an operation is performed to short-circuit both the primary bypass circuit 220 and the secondary bypass circuit 320 when the step-up/step-down ratios are to be modified to different values on the primary conversion circuit 20 and the secondary conversion circuit 30. However, an operation may be performed to short-circuit only one of the bypass circuits.

Furthermore, when the upper and lower arms of one of the arm circuits constituting the full bridge circuit are both switched OFF such that a step-up/step-down operation is performed using the other arm circuit, only the short-circuit control element inserted between the midpoint of the other arm circuit and the center tap need be switched ON.

In FIG. 1, for example, when a step-up/step-down operation is to be performed using the primary first arm circuit 207 in a condition where the primary second upper arm V1 and the primary second lower arm /V1 are both OFF, only the primary first short-circuit control element X1 inserted into the bypass passage between the midpoint 207m and the center tap 202m need be switched ON. In this case, the primary second short-circuit control element Y1 may be left OFF, or the primary second short-circuit control element Y1 may be omitted. Similarly, when a step-up/step-down operation is to be performed using the primary second arm circuit 211 in a condition where the primary first upper arm U1 and the primary first lower arm /U1 are both OFF, only the primary second short-circuit control element Y1 inserted into the bypass passage between the midpoint 211m and the center tap 202m need be switched ON. In this case, the primary first short-circuit control element X1 may be left OFF, or the primary first short-circuit control element X1 may be omitted. Note that this applies likewise to the secondary conversion circuit 30.

Furthermore, when the step-up/step-down ratios are to be modified to different values on the primary conversion circuit 20 and the secondary conversion circuit 30, the duty ratios of the primary conversion circuit 20 and the secondary conversion circuit 30 may be made different to each other by making the switching period T of the switching elements constituting the primary full bridge circuit 200 different to the switching period T of the switching elements constituting the secondary full bridge circuit 300 (see FIG. 4).

What is claimed is:

1. An electric power conversion system comprising:
   a primary conversion circuit comprising a primary coil, a primary magnetic coupling reactor, a primary positive electrode bus, a primary negative electrode bus, and a primary bypass circuit;
   a secondary conversion circuit comprising a secondary coil, a secondary magnetic coupling reactor, a secondary positive electrode bus, a secondary negative electrode bus, and a secondary bypass circuit;

a first input/output port provided between the primary positive electrode bus and the primary negative electrode bus;

a second input/output port provided between the primary negative electrode bus and a center tap of the primary coil;

a third input/output port provided between the secondary positive electrode bus and the secondary negative electrode bus; and a fourth input/output port provided between the secondary negative electrode bus and a center tap of the secondary coil, wherein the primary bypass circuit is configured to short-circuit one end of the primary coil of the primary conversion circuit to another end of the primary coil, and wherein the secondary bypass circuit is configured to short-circuit one end of the secondary coil of the secondary conversion circuit to another end of the secondary coil.

2. The electric power conversion system according to claim 1, wherein the primary coil and the secondary coil configure a center tapped transformer.

3. The electric power conversion system according to claim 2, wherein the primary conversion circuit further comprises a primary first upper arm, a primary first lower arm, a primary second upper arm, and a primary second lower arm, and wherein the primary coil, the primary magnetic coupling reactor, the primary first upper arm, the primary first lower arm, the primary second upper arm, and the primary second lower arm configure a primary full bridge circuit.

4. The electric power conversion system according to claim 2, wherein the secondary conversion circuit further comprises a secondary first upper arm, a secondary first lower arm, a secondary second upper arm, and a secondary second lower arm, and wherein the secondary coil, the secondary magnetic coupling reactor, the secondary first upper arm, the secondary first lower arm, the secondary second upper arm, and the secondary second lower arm configure a secondary full bridge circuit.

5. The electric power conversion system according to claim 4, wherein the secondary first upper arm, the secondary first lower arm, the secondary second upper arm, and the secondary second lower arm are switching elements that respectively include an N channel MOSFET and a body diode serving as a parasitic element of the N channel MOSFET.

6. The electric power conversion system according to claim 4, wherein the bypass circuit is a secondary bypass circuit provided in the secondary conversion circuit, and the secondary bypass circuit includes a short-circuiting structure that connects the secondary magnetic coupling reactor directly to the center tap of the secondary coil without passing through the secondary coil.

7. The electric power conversion system according to claim 6, wherein the short-circuiting structure of the secondary bypass circuit includes a secondary first short-circuit control element capable of short-circuiting respective ends of a secondary first winding, and a secondary second short-circuit control element capable of short-circuiting respective ends of a secondary second winding, and an intermediate connection point between the secondary first short-circuit control element and the secondary second short-circuit control element is connected to the center tap of the secondary coil.

8. The electric power conversion system according to claim 3, wherein the primary first upper arm, the primary first lower arm, the primary second upper arm, and the primary second lower arm are switching elements that respectively include an N channel MOSFET and a body diode serving as a parasitic element of the N channel MOSFET.

9. The electric power conversion system according to claim 1, wherein the primary bypass circuit includes a short-circuiting structure that connects the primary magnetic coupling reactor directly to the center tap of the primary coil without passing through the primary coil, and wherein the secondary bypass circuit includes a short-circuiting structure that connects the secondary magnetic coupling reactor directly to the center tap of the secondary coil without passing through the secondary coil.

10. The electric power conversion system according to claim 9, wherein the short-circuiting structure of the primary bypass circuit includes a primary first short-circuit control element capable of short-circuiting respective ends of a primary first winding, and a primary second short-circuit control element capable of short-circuiting respective ends of a primary second winding, and an intermediate connection point between the primary first short-circuit control element and the primary second short-circuit control element is connected to the center tap of the primary coil.

* * * * *